United States Patent

Poylo

[15] 3,665,087
[45] May 23, 1972

[54] MANIKIN AUDIO SYSTEM

[72] Inventor: Michael C. Poylo, New York, N.Y.

[73] Assignee: International Telephone and Telegraph Corporation, Nutley, N.J.

[22] Filed: Nov. 25, 1970

[21] Appl. No.: 92,788

[52] U.S. Cl. ................................................. 35/17
[51] Int. Cl. ...................................... G09b 23/30
[58] Field of Search ...................................... 35/17

[56] References Cited

UNITED STATES PATENTS

| | | |
|---|---|---|
| 3,520,071 | 7/1970 | Abrahamson et al. .................. 35/17 |
| 3,564,729 | 2/1971 | Ackerman ............................... 35/17 |

*Primary Examiner*—Harland S. Skogquist
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

The manikin audio system described is an audio simulation system in which it is not necessary to have the audio signals emanating directly from a physical area under auscultation, but in which the proper sound is acoustically coupled to the ears of a listener when a particular region of the manikin is explored. The audio simulation system comprises a synthetoscope having a transducer and a contact portion which activates one of a plurality of responsive means within the manikin. Each of the responsive means selects an associated one of a plurality of stored signals and couples the selected signal to a transducer located within the synthetoscope to provide a high quality audio signal.

11 Claims, 7 Drawing Figures

INVENTOR
MICHAEL C. POYLO
ATTORNEY

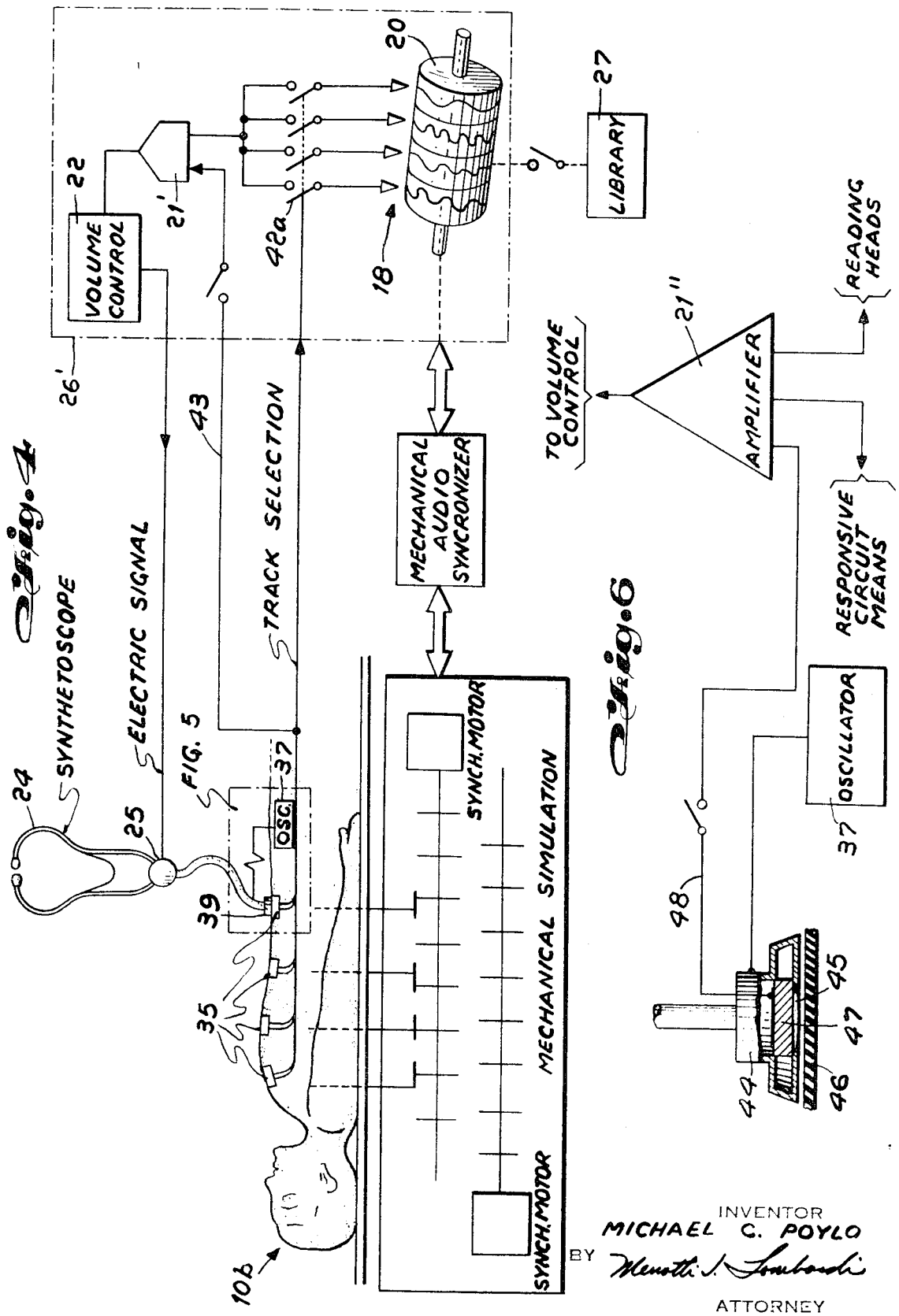

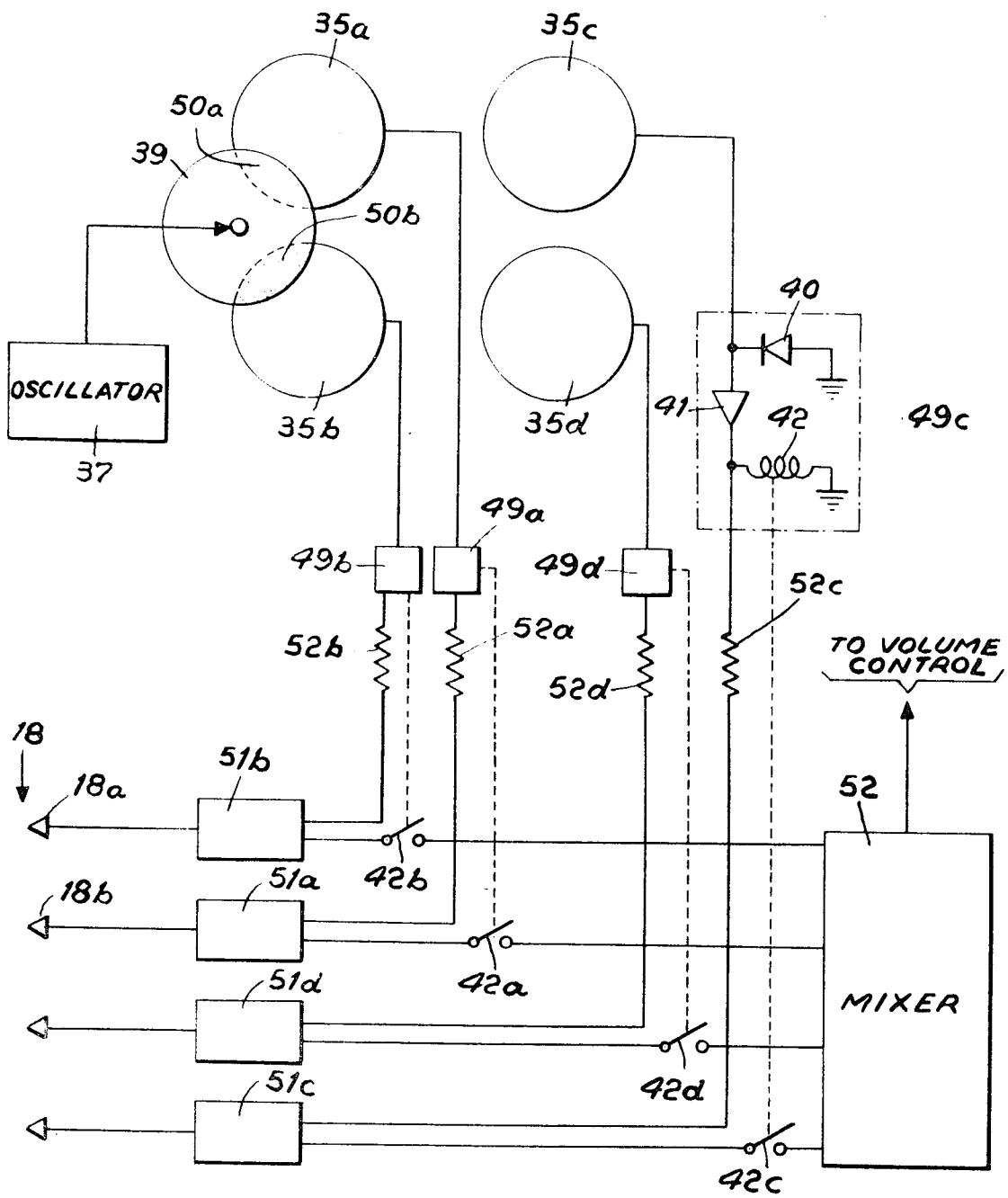

3,665,087

MANIKIN AUDIO SYSTEM

BACKGROUND OF THE INVENTION

In general, this invention relates to a manikin audio system for simulating audio signals in certain portions of a physical area of the manikin under auscultation. As illustrated in FIG. 1, a manikin is provided which may be utilized to teach, for example, heart diseases wherein the sounds are simulated and the audio signals emanating from a particular physical area are detected. The manikin 10 provides a high degree of realism to the touch of a person. The mechanical simulation 11 includes synchronization motors and gearing which are contained within the manikin and move the various portions of the manikin's chest to simulate normal movement of a human. According to this prior art, a conventional stethoscope 12 is utilized to pick up recorded simulator sounds emanating from small size loud speakers 13 suitably located within the manikin. The sounds are coupled from rotating wheels having magnetic tape fixed to their circumference and indicated generally by numeral 14. The four wheels are synchronized by means 15 which may be a mechanical coupling, with the mechanical simulation sequences of the mechanical simulator 11. The four wheels are coupled to four magnetic reading heads and amplifiers which, in turn, are coupled to the four loud speakers 13.

This system provides the required synchronization between the mechanical and audio portion, and produces the required periodic repetition of the sound signal which is necessary to enable the manikin to serve as a teaching tool.

However, the ability of this system to satisfactorily perform other important and needed functions appears limited. For example, to properly reproduce the frequency band required to simulate heart sounds, the system must have an audio bandwidth providing good frequency response as low as 20/30 cps. It is not practical to achieve such a frequency response using small diameter speakers acoustically coupled to a stethoscope as illustrated and described. In addition, this prior art system does not have the ability to provide any stethoscope sounds which have an acceptable level of signal-to-noise ratio. Despite all the precautions taken, including insulation and isolation, it appears that anything other than a high-audio noise level background can be expected with this arrangement. The large number of mechanical parts providing the mechanical simulation moving within and around the chamber constituting the thoracic cage of the manikin causes a high-noise level for the stethoscope, and makes it very difficult to distinguish the variations of sound which must be detected as the head of the stethoscope is moved to the various positions on the manikin.

SUMMARY OF THE INVENTION

It is therefore an object of this invention to provide an improved manikin audio system.

It is another object of this invention to provide an improved audio system having good signal-to-noise ratio and good low frequency response.

A feature of this invention is to provide an audio simulation system in which it is not necessary to have the audio signals emanating directly from the physical area under auscultation, but to have the proper sound acoustically coupled to the ears of a listener at the time a particular region of the manikin is explored.

According to the broader aspects of the invention there is provided an audio system for a manikin comprising signal producing means, a synthetoscope coupled to said signal means, and means within said manikin responsive to said synthetoscope to select one of a plurality of signals stored in said signal producing means. The synthetoscope includes a transducer which is coupled to receive the selected signal and produce an audio signal.

BRIEF DESCRIPTION OF THE DRAWINGS

The objects and features of the invention will best be understood by reading the following description in connection with the drawings, in which:

FIG. 3 illustrates the skin composition of the manikin according to the prior art;

FIG. 4 illustrates another embodiment of the invention;

FIG. 5 illustrates the portion of the arrangement indicated in FIG. 4;

FIG. 6 illustrates a modification for the embodiment described in connection with FIGS. 4 and 5; and FIG. 7 illustrates another modification for the embodiment described in connection with FIGS. 4 and 5.

DESCRIPTION OF THE PREFERRED EMBODIMENTS

Figure 1:
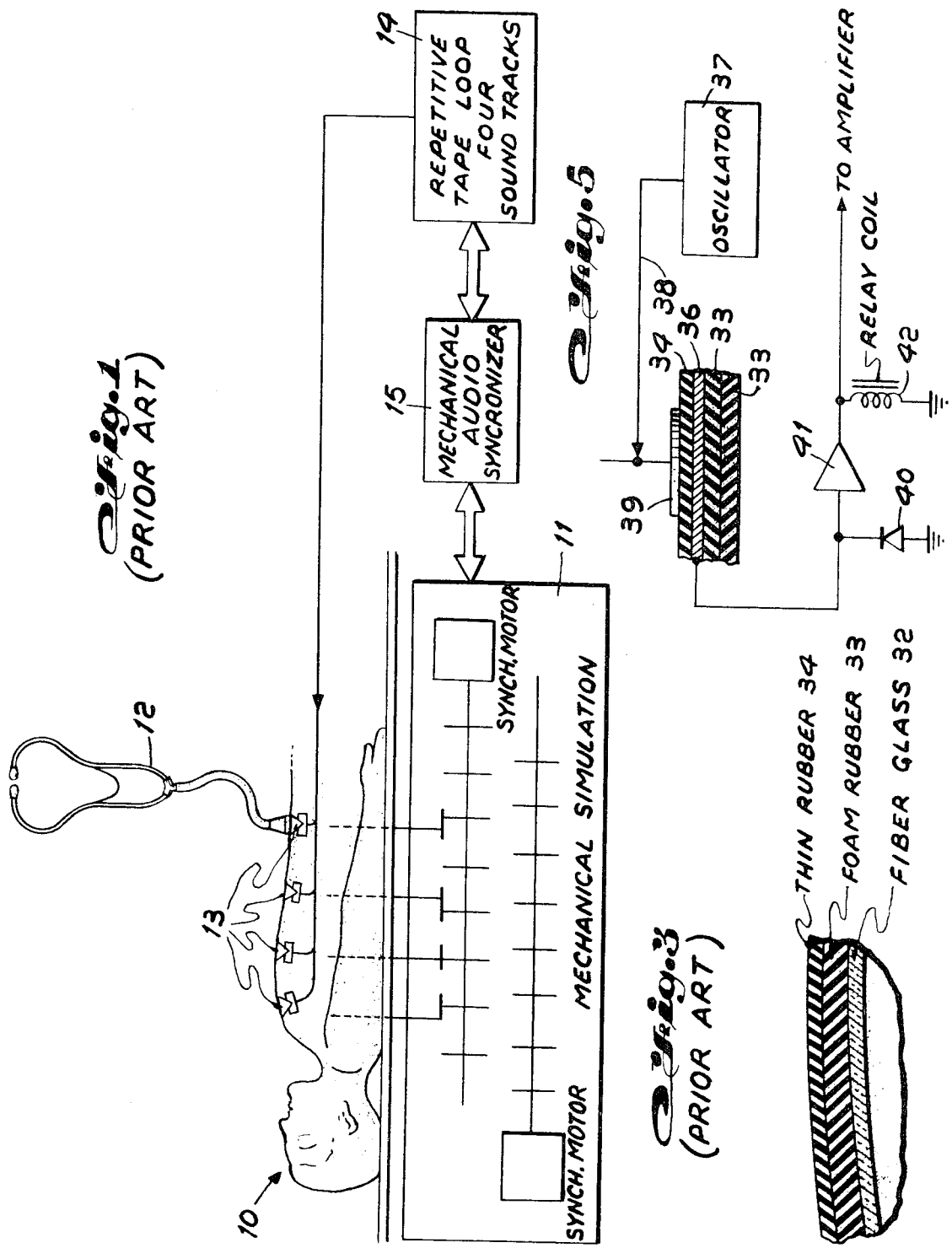
FIG. 1 illustrates a manikin and audio system according to the prior art.
Figure 2:
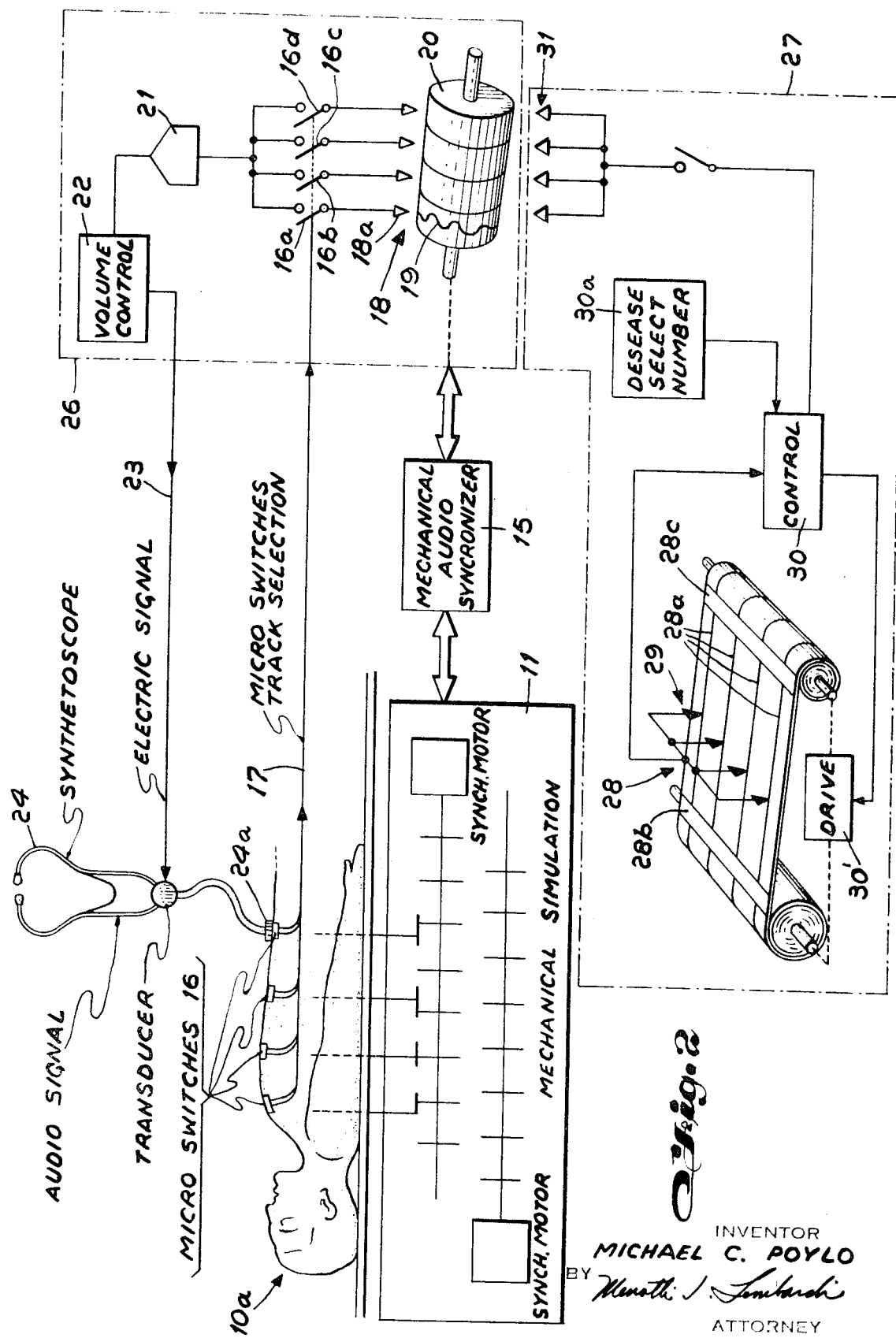
FIG. 2 illustrates one embodiment of an improved manikin audio system according to the invention.

Referring now to FIG. 2 one embodiment of the invention is illustrated. In this embodiment a modified manikin 10A containing the mechanical simulation arrangement is illustrated. Within the modified manikin is a plurality of micro switches 16 having contacts 16a to 16d which are positioned in various physical areas for auscultation. The micro switches are connected by lines 17 to connect individual ones of magnetic reading heads 18 to amplifier 21. For example, when a micro switch 16A is closed, reading head 18A couples the signal information 19 on magnetic recording medium 20 to amplifier 21. The magnetic medium 20, which may be a drum, tape, or disc, is rotated by synchronizer 15 in synchronism with the mechanical simulation so that the output signal 19 follows the predetermined described pattern of simulation. The audio signal from amplifier 21 is coupled through a volume control 22 by line 23 to a synthetoscope 24. The synthetoscope 24 contains a transducer 25 which is connected via line 23 to the just described signal producing means 26. The contacting part 24a of the synthetoscope in this embodiment, will be inactive but it will be used as if it were active. The pressure applied with the contact part 24a on the manikin will actuate one of the plurality of hidden micro switches 16 to select the associated recording track on medium 20 to feed the detected electrical signal to the synthetoscope's transducer 25. The transducer 25 will, in turn, provide the acoustical signal to the ear of the synthetoscope. This arrangement will provide a high quality audio signal with realistic relation between the body location being explored and the desired sound.

In addition, modifications to the basic system can be made by selecting from a library 27 containing a number of diseases, one disease with its four associated audio tracks. One such tape library and sound selection system is illustrated within dotted lines 27. Such a system could include a storage tape arrangement 28, a plurality of reading heads 29 for reading one four channel section 28a, representing one disease. Control means 30 is selectively coupled to control the write-erase heads 31 to cause new audio signal information to be written on individual tracks of medium 20. Spaces 28b, c separate each disease and can be counted by control means 30, a signal is then provided to forward-reverse drive 31 corresponding to movement required by the disease select number 30a. In this manner, it is relatively easy for one to select from such a library, one of many diseases and learn the proper audio signals that should emanate from a particular location under auscultation in a realistic and accurate manner. Of course, it should be evident to one skilled in the art that the tape 28 with its channels 28A could be replaced by drums, cards, or other storage means to feed the recorded sounds to the respective channels on medium 20.

Although the audio signal produced by the embodiment of FIG. 2 provides satisfactory reproduction, certain physicians, for example, have a habit of keeping the stethoscope in their ears while palpitating certain regions of the body. This contact would activate a micro switch and produce an unwanted signal which would be undesirable for teaching purposes. Accordingly, the embodiment described in connection with FIG. 4 overcomes this limitation.

Since, as illustrated in FIG. 3, the thoracic cage of the manikin consists of a fiber glass structure 32 providing the desired shape, a layer of foam rubber 33, and a thin rubber skin 34 placed over the foam rubber. The arrangement according to FIGS. 4 and 5 utilizes the manikin structure of FIG. 3 in the following manner. In each of the individual areas 35 there is placed a thin metallic flexible foil, mesh, or conductive paint 36. As illustrated in FIG. 5, the metallic surface 36 is placed between the thin rubber 34 and the foam rubber 33. A signal generator 37, which may be a 5 megacycle oscillator, has its output connected by line 38 to conductive electrode 39 which forms the lower part of synthetoscope 24. When the conductive electrode 39 is placed on the outside of thin rubber 34 it creates, in combination with the metallic foil 36 a capacitance which couples the output from the oscillator 37 to a following responsive circuit means to select the associated individual track on the recording medium to amplifier 21'. The responsive means includes a diode 40 to detect the coupled signal, a driver amplifier 41 whose output energizes a relay coil 42 and closes its associated contact 42A.

Since each area 35 includes a detector, amplifier, and a relay coil, the coil that is activated closes its contact and couples the associated channel on the storage medium 20, via one of the recording heads 18, to the amplifier 21'. The signal output is then fed through the volume control and to the transducer in the manner described in connection with FIG. 2. In addition, the recorded information on medium 20 can be changed by means of library 27.

The arrangement according to FIG. 4 also permits the simulation of a variable signal amplitude from the different areas 35 to be auscultated. This can be achieved in many ways, one is by varying the dielectric constant of the insulating material 34 by using a material of different dielectric constant and thickness. Another way is to vary the nature of the metallic surface 36 from a loose mesh to a solid foil. These variations in coupling will change the amplitude of signal coupled to means 40,41 (FIG. 5) and this variation of AC signal causes the output from amplifier 41 to be increased or decreased. This increased or decreased output, besides activating a coil 42, can be used to vary the gain of amplifier 21' (FIG. 4) by means of connection 43. Since each of the areas 35 can have varying coefficience of coupling, and thereby a different bias can be coupled to vary the gain of amplifier 21', the audio response of each of the areas 35 can be made to closely simulate the phenomena which occurs within the body.

It should be noted that most users of a standard stethoscope vary the frequency response of the instrument by applying more or less pressure at the point of auscultation. According to the modification illustrated in FIG. 6, this behavior is simulated. As shown, the lower conductive portion 44 of the synthetoscope is directly coupled to the output of oscillator 37. A movable member 45, when contacting the manikin surface 46, causes varying degrees of pressure to be applied to piezo electric crystal 47. The output of the crystal is selectively coupled by line 48 to amplifier 21'' to control its frequency response. The amplifier 21'' also has inputs from the reading heads and responsive circuit means. According to this arrangement, the output signal from the amplifier 21'' is not only determined by the selection of a particular recording track, but the amplifier is gain controlled by the bias from the responsive means, and the signal coupled from the crystal modifies its frequency response. This additional modification permits a degree of flexibility in simulating the sounds emanating from the manikin, and creates for study the read life audio sounds associated with a particular disease.

FIG. 7 illustrates an embodiment for operation with more than one of the areas 35a–d being contacted by probe 39. This arrangement increases the realistic conditions of heart sounds by combining different parts of the heart, or other natural sounds from the chest cavity. From each area 35 there is coupled the responsive means 49 to control the closing of the associated contacts 42a–d. A minimum area 50 must be covered by probe 39 to satisfy the coil threshold voltage requirements to close its contacts. It is possible that more than one contact will close and a means must be provided to handle the additional signal in proportion to the area covered.

The means to proportionally combine the signals include amplifiers 51a–d individually coupled to reading heads 18, resistors 52a–d coupled between the responsive means 49 and amplifiers 51, and a mixer 52 to produce the combined output signal. The DC voltage developed on resistors 52 is in proportion to the area 50 covered by probe 39 and is used to regulate the gain of amplifiers 51.

As illustrated in FIG. 7, if each area 50a,b is sufficient to meet the threshold requirements of responsive means 49a,b, then associated contacts 42a,b will close and couple the signals from reading heads 18a,b to mixer 52. The output of amplifiers 51a,b is controlled by the DC voltage developed across resistors 52a,b, which is proportional to the areas 50a,b.

There is described herein a manikin audio system in which means is provided to store and produce at least one of a plurality of signals, in which a synthetoscope is coupled to receive the one signal and reproduce an audio signal, and in which means positioned within the manikin and activated by the synthetoscope select the one signal to be coupled to the synthetoscope.

Although I have described my invention in connection with specific apparatus, it should be clearly understood that it is by way of example only and not as a limitation on the scope of my invention as set forth in the objects thereof and in the accompanying claims.

I claim:

1. Audio system for a manikin comprising:
   signal producing means;
   a synthetoscope coupled to said signal means; and
   means within said manikin responsive to said synthetoscope to select one of a plurality of signals stored in said signal producing means.

2. The system of claim 1 wherein said synthetoscope includes a transducer coupled to receive said selected signal and produce an audio signal.

3. The system of claim 1 wherein said response means includes a plurality of switches which are individually activated by said synthetoscope to select said one signal.

4. The system of claim 1 wherein said synthetoscope includes a conductive probe to contact one of a plurality of predetermined areas on said manikin.

5. The system of claim 4 including:
   an oscillator coupled to said probe;
   detector means capacitively coupled to said oscillator; and
   means responsive to the output of said detector means to select said one signal associated with the one predetermined area.

6. The system of claim 5 wherein said signal producing means includes an amplifier having its input coupled to said selected one signal and being biased by the output of said detector means to control its gain.

7. The system of claim 6 including a transducer position within said conductive probe to produce an output representative of the pressure applied by said probe on said manikin, said output being coupled to said amplifier to control its frequency response.

8. The system of claim 1 including a library of stored signal information which is selectively transferable to said signal producing means.

9. The system of claim 1 wherein said signal producing means is operated in a predetermined synchronism with said manikin operation.

10. A manikin audio system comprising:
    means for storing and producing at least one of a plurality of signals;
    a synthetoscope coupled to receive said one signal; and responsive means within said manikin and activated by said synthetoscope to select said one stored signal.

11. The system of claim 10 including means to proportionally combine at least two of said plurality of signals.

* * * * *